(12) United States Patent
Breunig et al.

(10) Patent No.: US 6,545,115 B2
(45) Date of Patent: Apr. 8, 2003

(54) PROCESS FOR PREPARING A STABLE SILICONE OIL CONTAINING SIH GROUPS AND HYDROSILYLABLE FUNCTIONS

(75) Inventors: Stefan Breunig, Vienne (FR); Gerard Mignani, Lyons (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/833,928

(22) Filed: Apr. 12, 2001

(65) Prior Publication Data

US 2002/0028899 A1 Mar. 7, 2002

Related U.S. Application Data

(63) Continuation of application No. 09/319,843, filed as application No. PCT/FR97/02256 on Dec. 10, 1997, now abandoned.

(30) Foreign Application Priority Data

Dec. 11, 1996 (FR) .............................................. 96 15519

(51) Int. Cl.[7] .............................................. C08G 77/12
(52) U.S. Cl. .......................... 528/31; 502/185; 528/15; 528/19; 528/32; 556/451; 585/435; 549/512
(58) Field of Search ............................. 502/185; 528/15, 528/19, 31, 32; 556/451; 585/435; 549/512

(56) References Cited

U.S. PATENT DOCUMENTS

| 5,527,935 A | 6/1996 | Stepp et al. |
| 5,561,231 A | 10/1996 | Dahth et al. |
| 5,663,222 A | 9/1997 | Gay et al. |
| 6,124,418 A | 9/2000 | Crivello et al. |

FOREIGN PATENT DOCUMENTS

| JP | 58-152022 | 9/1983 |

OTHER PUBLICATIONS

Encyclopedia of Chemical Technology, 4 th Ed., vol. 5, 1993.

*Primary Examiner*—Margaret G. Moore
*Assistant Examiner*—Kuo-Liang Peng

(57) ABSTRACT

The invention concerns a novel method for preparing stable silicone fluid containing ≡SiH groups. The preparation method is carried out from a first silicone fluid containing ≡SiH groups and monomers with both a functional group and a group capable of hydrosylilation; the mol ratio monomer ≡SiH of said fluid ranging from 0.0001 and 1. The fluids obtained by this novel method are used particularly for producing antiadhesive coatings.

16 Claims, No Drawings

PROCESS FOR PREPARING A STABLE SILICONE OIL CONTAINING SIH GROUPS AND HYDROSILYLABLE FUNCTIONS

This application is a continuation application of application Ser. No. 09/319,843 filed on Aug. 16, 1999, now abandoned which is a 371 of PCT/FR97/02256 filed Dec. 10, 1997.

The present invention relates to a novel process for preparing a stable silicone oil containing ≡SiH groups and hydrosilylable functions. In particular, the invention relates to a process of hydrosilylation between silicone oils containing ≡SiH groups and monomers with two hydrosilylable units.

Reactions of silicone oils containing ≡SiH groups with olefins or acetylenic hydrocarbons are very well known. The silicone oils are, for example, of the formulae:

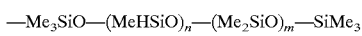

in which n and m are integers or fractions such that $1 \leq n \leq 1000$ and $0 \leq m \leq 1000$;

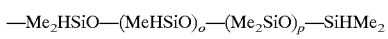

in which o and p are integers or fractions such that $0 \leq o \leq 1000$ and $0 \leq p \leq 1000$.

Many monomers can functionalize silicone oils; for example, alkenes, styrenes, allyl alcohols, allyloxy ethers or allylamines are used as monomers.

These reactions are very commonly used for the synthesis of functionalized silicone oils starting with silicone oils containing ≡SiH groups, which, during the hydrosilylation reaction, are functionalized by the monomers. The oils obtained, containing virtually no ≡SiH units, have applications in very wide fields such as anti-adhesion and lubrication.

In particular, functionalized oils can be prepared with 1,2-epoxy-4-vinylcyclohexane monomers. By way of application, these functionalized silicone oils are then thermally crosslinked in the presence of an acid catalyst such as hydrochloric acid or sulphuric acid, or photochemically crosslinked in the presence, for example, of a cationic photo-initiator for the preparation of anti-adhesive films for paper and/or plastics.

A very large number of catalytic compositions is used in hydrosilylation reactions. The catalytic compositions most widely known contain metals such as platinum, rhodium, cobalt or palladium. Specific examples of such catalytic compositions are platinum halides and rhodium halides, for example $H_2PtCl_6$, $PtCl_2$, $(RhCl_3 \cdot H_2O)$, complexes of platinum with siloxanes containing unsaturated groups, complexes of platinum with olefins and cationic complexes of platinum with nitrites as ligands.

Generally, the catalytic compositions used in the hydrosilylation reaction are homogeneous catalytic compositions, i.e. the said compositions are dissolved in the reaction medium. One of the compositions most widely used is the catalytic Karstedt composition described in particular in U.S. Pat. No. 3,775,452.

However, during the hydrosilylation reaction according to processes of the prior art, isomerization reactions of the unsaturated monomers are observed to different degrees, which makes it necessary to work with a molar excess of monomer relative to the silicone oil in the reaction medium.

Moreover, when it is desired to prepare silicone oils comprising both ≡SiH groups and hydrosilylable functions in the structure, the processes of the prior art are inapplicable and unsuitable; the silicone oils obtained are not stable to allow their subsequent use. In particular, during the devolatilization step, the hydrosilylable functions grafted onto the silicone oil structure have a tendency to react together, as in the case of the totally functionalized silicone oils, and/or with the ≡SiH groups of the silicone oil obtained; this gives rise to uncontrolled polymerization and crosslinking reactions and is reflected in the formation of gum and/or resin. These reactions can be initiated in particular by the presence of a trace of the usual catalytic compositions, such as homogeneous catalytic compositions.

In addition, the functionalized silicone oils obtained from processes using homogeneous catalysis are generally colored, from about 80 to about 300 Hazen; consequently, this limits the fields in which it can be envisaged to use them, in particular in transparent and anti-adhesive films for paper or for transparent films (for example of polyester type). In these cases, the silicone oil requires additional purification steps in order to be usable after crosslinking, in transparent films; these additional steps make the industrial implementation expensive and thus economically relatively non-viable.

The Applicant has developed a novel process for preparing a stable silicone oil, containing both ≡SiH groups and hydrosilylable functions, and which allows the drawbacks mentioned above to be reduced significantly, in particular the uncontrolled reactions during the devolatilization step.

This novel process for preparing a stable silicone oil containing ≡SiH groups and hydrosilylable functions is carried out using a first silicone oil containing ≡SiH groups and monomers with two hydrosilylable units.

The silicone oils obtained from the process according to the invention comprise both ≡SiH groups and hydrosilylable functions and are stable during the devolatilization step and stable on storage; this makes it possible subsequently to use the silicone oils according to the invention in applications which require both the presence of ≡SiH groups and hydrosilylable monomers.

In addition, the process according to the invention makes it possible to obtain colorless and transparent oils, with a very low coloration from about 3 to about 100 Hazen, without requiring decolorization and/or purification steps which are relatively non-viable economically and industrially. Needless to say, it is necessary, for this purpose, for the starting monomers to be colorless and transparent.

In particular, the silicone oils obtained from the process of the invention can be used, after crosslinking, in transparent and anti-adhesive films and coatings for papers, for glasses and for plastics.

This novel process for preparing a stable silicone oil containing ≡SiH groups and hydrosilylable functions from a starting oil, referred to as the first silicone oil, containing ≡SiH groups and monomers with two hydrosilylable units, comprises the following steps:

(a) an amount of from 5 to 5000 ppm, preferably from 10 to 100 ppm, of heterogeneous catalytic composition relative to the total mass of the reagents is introduced into the reaction medium;

(b) the first silicone oil is introduced into the reaction medium;

(c) the said reaction medium is heated to a temperature of between 25° C. and 200° C. and preferably between 50° C. and 160° C.;

(d) the monomers are then introduced over a period of between 0 and 24 h, preferably between 2.5 and 5 h; the monomer/≡SiH molar ratio of the said oil is between 0.0001 and 1;

(e) the silicone oil obtained containing ≡SiH groups and hydrosilylable functions is then separated from the heterogeneous catalytic composition, for example by filtration; and (f) the silicone oil containing ≡SiH groups and hydrosilylable functions is finally devolatilized.

The separation step (e) makes it possible, where appropriate, to remove all trace of turbidity from the functionalized silicone oil obtained. Moreover, the heterogeneous catalytic composition can be recovered and then reused, without the need for regeneration, with or without washing, and without any appreciable reduction in its performance characteristics being detected. As regards the devolatilization (f), the stability of the silicone oils is not affected during this step.

Furthermore, the process according to the invention can advantageously be carried out in bulk, which means that the reaction between the silicone oil and the monomer(s) is carried out in the absence of solvent. However, many solvents such as toluene, xylene, octamethyltetrasiloxane, cyclohexane or hexane can be used.

Virtually any type of monomer containing two hydrosilylable units can be used in the present process. Furthermore, the monomers used can be identical and/or different. However, preferably, at least one of the hydrosilylable units of the monomers is a vinyl or allylic unit.

The best results for the preparation of silicone oils, in accordance with the spirit of the invention, were obtained with monomers having the formulae:

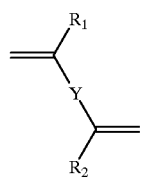

(I)

in which:

the symbols $R_1$ and $R_2$, which may be identical and/or different, correspond to a monovalent hydrocarbon-based radical chosen from a phenyl radical and linear or branched alkyl radicals containing from 1 to 12 carbon atoms, preferably a hydrogen atom or a methyl radical;

the symbol Y corresponds to Y'-Y"-Y' in which:
the symbol Y" corresponds to a divalent radical chosen from —(C=O)—, —(NH)—, —O—, —(C=O)—O—, —NH—(C=O)— and a free valency,
the symbols Y', which may be identical and/or different, correspond to a divalent hydrocarbon-based radical chosen from linear or branched alkyl radicals containing from 1 to 6 carbon atoms and a free valency, it being possible for one of the radicals Y' to be a phenyl radical or an alkylaryl radical in which the linear or branched alkyl part comprises 1 to 6 carbon atoms.

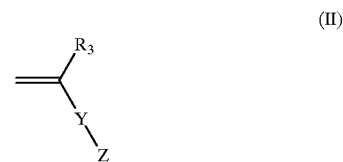

(II)

in which:

the symbol Z corresponds to a monovalent radical —$NHR_4$ or OH, the symbols $R_3$ and $R_4$, which may be identical and/or different, correspond to a monovalent hydrocarbon-based radical chosen from a phenyl radical and linear or branched alkyl radicals containing from 1 to 12 carbon atoms; and preferably a hydrogen atom or a methyl radical, the symbol Y corresponds to Y'-Y"-Y', in which:
the symbol Y" corresponds to a divalent radical chosen from —(C=O)—, —(NH)—, —O—, —(C=O)—O—, —NH—(C=O)— and a free valency,
the symbols Y', which may be identical and/or different, correspond to a divalent hydrocarbon-based radical chosen from linear or branched alkyl radicals containing from 1 to 6 carbon atoms, and a free valency, it being possible for one of the radicals Y' to be a phenyl radical or an alkylaryl radical in which the linear or branched alkyl part comprises 1 to 6 carbon atoms,

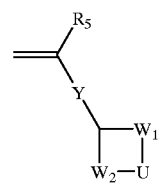

(III)

in which:

the symbol U corresponds to a divalent radical chosen from —NH—, —(C=O)—, —(C=O)—NH—, and —(C=O)—O—(C=O)—, the symbol $R_5$ corresponds to a monovalent hydrocarbon-based radical chosen from a phenyl radical and linear or branched alkyl radicals containing from 1 to 12 carbon atoms, preferably a hydrogen atom or a methyl radical;

the symbols $W_1$ and $W_2$, which may be identical and/or different, correspond to a divalent hydrocarbon-based radical chosen from a phenyl radical, linear or branched alkyl radicals containing from 1 to 12 carbon atoms, alkylaryl radicals in which the linear or branched alkyl part comprises 1 to 6 carbon atoms, and a free valency, the symbol Y corresponds to Y'-Y",-Y', in which:
the symbol Y" corresponds to a divalent radical chosen from —(C=O)—, —(NH)—, —O—, —(C=O)—O—, —NH—(C=O)—, and a free valency,
the symbols Y', which may be identical and/or different, correspond to a divalent hydrocarbon-based radical chosen from linear or branched alkyl radicals containing from 1 to 6 carbon atoms, and a free valency, it being possible for one of the radicals Y' to be a phenyl radical or an alkylaryl radical in which the linear or branched alkyl part comprises 1 to 6 carbon atoms.

According to a preferred embodiment of the process according to the invention, the monomers used to prepare the silicones according to the invention are monomers in which one of the hydrosilylable units is a vinyl or allylic unit and contains at least one hydrocarbon-based ring in which at least one oxygen atom is included.

Mention will be made in particular of the monomers of formulae:

(IV)

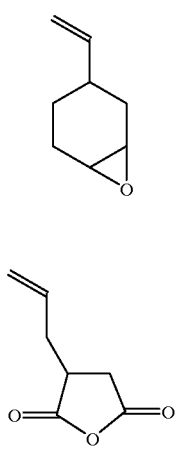

(V)

According to another preferred embodiment of the process according to the invention, the monomers used to prepare the silicones according to the invention are monomers in which one of the hydrosilylable units is a vinyl or allylic unit and contains at least one hydrocarbon-based ring in which a nitrogen atom forming a stearically hindered amine is included. These stearically hindered amines can advantageously be of HALS type, for example, of formula:

(VI)

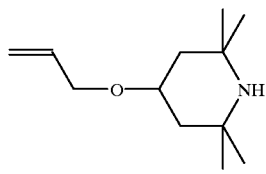

Besides the monomers cited as preference, other types of monomer can be used, for example, in a non-limiting manner:

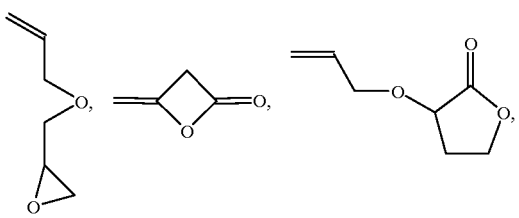

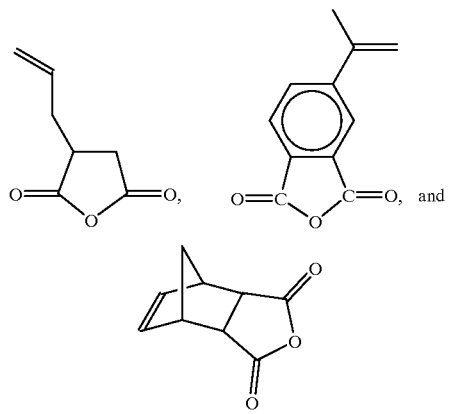

When the monomers contain a hydrosilylable function in the form of a ring containing an oxygen atom, for example 1,2-epoxy-4-vinylcyclohexane [formula (IV)], it is noted that the use of the novel process for preparing stable silicone oils containing both ≡SiH groups and hydrosilylable functions of this type makes it possible to significantly reduce the isomerization reactions of the unsaturated monomer and, furthermore, to substantially reduce the opening of the ring containing an oxygen atom present on the unsaturated monomer during the hydrosilylation and during the devolatilization step.

Thus, according to the process of the invention, silicone oils which are very stable over time, containing both ≡SiH groups and hydrosilylable functions (epoxy, vinyl, etc.) are obtained, which makes it possible to use them in applications requiring, firstly, stability of the silicone oils, i.e. the unreactivity of the ≡SiH groups and of the hydrosilylable functions, and, secondly, during their use, the reactivity (for example: crosslinking) of the hydrosilylable functions with each other and, simultaneously or otherwise, the reactivity of the said hydrosilylable functions with the ≡SiH groups.

In accordance with the process according to the invention, the starting oils, also referred to as first oils in the context of the disclosure of the invention, are of diverse nature. They are either linear or cyclic and have the average formulae (VII) and/or (VIII):

(VII)

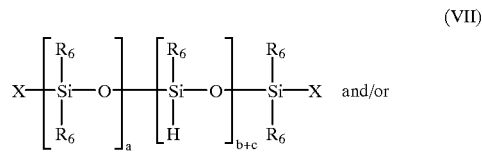

and/or (VIII)

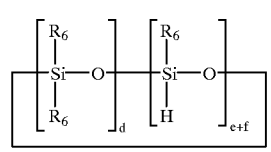

in which:
the symbols $R_6$ are identical or different and correspond to a monovalent hydrocarbon-based radical chosen from a phenyl radical and linear or branched alkyl radicals containing from 1 to 6 carbon atoms;

the symbols X are identical or different and correspond to a monovalent radical chosen from $R_6$, a hydrogen atom, a methoxy radical and an ethoxy radical;

a, b and c are integers or fractions such that;
0<a≦1000, preferably 0<a≦100,
0≦b+c≦200, preferably 1<b+c≦100, and at least one of the two groups X corresponds to a hydrogen radical if b+c=0,
1<a+b+c≦1000, preferably 1<a+b+c≦100;

d, e and f are integers or fractions such that:
0<d<10, preferably 0<d<5
1<e+f<10, preferably 1<e+f<5.

The silicone oils obtained are, respectively, silicone oils of formula (IX) and (X):

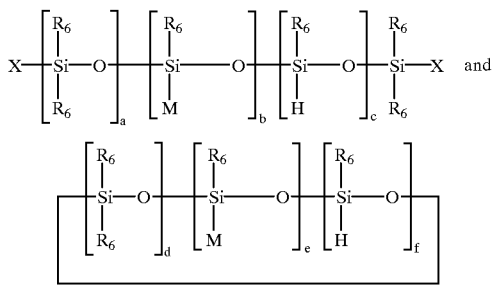

in which:

the symbols $R_6$, which may be identical or different, have the same meanings as above, the symbols X, which may be identical or different, correspond to M and/or have the same meanings as above and at least one of the two groups X corresponds to M if b=0, the symbols M, which may be identical or different, represent hydrosilylable units which is derived from the monomers described above, a, b, c, d, e and f have the same meanings as described above, and:
0≦b≦200,
1<e<9.

In the context of the invention, various types of heterogeneous catalytic composition can be used. The heterogeneous catalytic composition used comprises at least one metal chosen from the group consisting of cobalt, rhodium, ruthenium, platinum and nickel, deposited on an inert support, the metal preferably being platinum. The inert support is selected from the group consisting of carbon black, charcoal, α-alumina, silica, barium silicate and barium sulphate, the inert support preferably being carbon black. The amount of metal in the catalytic composition is advantageously between 0.1% and 5% relative to the weight of the inert support. In addition, this amount of metal in the catalytic composition is such that it is between 1 and 1000 ppm relative to the weight of the silicone oil.

Platinum on carbon black or charcoal, such as the catalytic composition containing 2.5% platinum by weight deposited on the support CECA 2S developed by the company CECA, the catalytic composition SCAT 20 (1% Pt) from the company Engelhard or the catalytic composition 88 231 (1% Pt) from the company Heraeus can be used, as non-limiting examples of catalytic compositions. In this case, the platinum can be deposited on this type of support by deposition of chloroplatinic acid followed by neutralization and reduction. Similarly, the use of platinum on alumina preferably of α type, such as the catalytic composition CAL 101 (0.3% Pt, SCS9 support consisting of α-alumina) sold by the company Procatalyse or the catalytic composition 88 823 from the company Heraeus (0.5% Pt on α-alumina), gives good results. Furthermore, other catalytic compositions from the company Engelhard are appropriate for use in the process according to the invention: the catalyst 8006 (5% Rh/carbon black); the catalyst 7025 (3% Pt/carbon black) and the catalyst 40968 (1% Pt/granular charcoal).

The process according to the invention can be carried out according to many variants. In particular, it is possible to use a first implementation in which all of the reagents and the catalytic composition are mixed together in the reaction medium ("batch" type). As a second embodiment of the process according to the invention, this process can be carried out continuously with a fixed bed of heterogeneous catalytic composition over or through which the silicone oil to be functionalized and the monomer(s) pass. This type of implementation is particularly advantageous when the grain size of the inert support for the catalytic composition is greater than 100 μm.

EXAMPLES

The examples below illustrate the preparation of functionalized silicone oils obtained according to the process of the present invention.

Depending on the starting silicone oil, the reaction scheme is as follows:

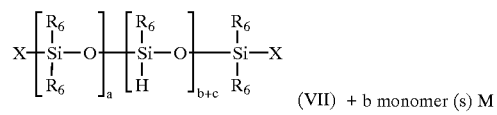

(VII) + b monomer(s) M

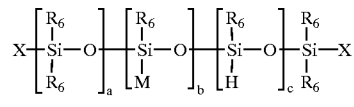

or

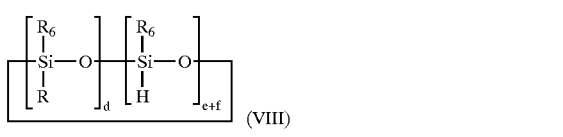

(VIII)

(VIII) + b monomer(s) M ⟶

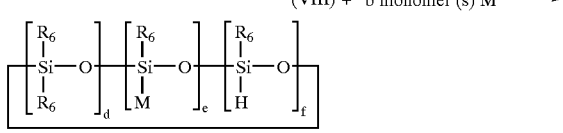

Examples 1, 2 and 5 relate to the synthesis of functionalized silicone oils by monomers M of 1,2-epoxy-4-vinylcyclohexane [formula (IV) above] or of allyloxypiperidine [formula (VI) above] with a silicone oil of formula (XI) in which the number of milliequivalents of ≡SiH functions is 119 per 100 g of oil. The reaction scheme is as follows:

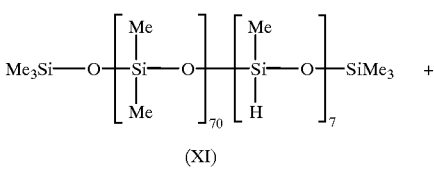

(XI)

-continued $$b' * M \xrightarrow{\text{Heterogeneous catalyst}}$$

$$Me_3Si-O-[SiMe_2-O]_{70}-[SiMeH-O]_{7-b'}-\left[\begin{array}{c}Me\\|\\Si-O\\|\\M\end{array}\right]_{b'}-SiMe_3$$

Examples 3, 4 and 6 relate to the synthesis of functionalized silicone oils with monomers M of 1,2-epoxy-4-vinylcyclohexane [formula (IV) above]-or of allyloxypiperidine [formula (VI) above] with a silicone oil of formula (XII) in which the number of milliequivalents of ≡SiH functions is 724 per 100 g. The reaction scheme is as follows:

$$H-\left[\begin{array}{c}Me\\|\\Si-O\\|\\Me\end{array}\right]_9-\left[\begin{array}{c}Me\\|\\Si-O\\|\\H\end{array}\right]_{4.5}-\begin{array}{c}Me\\|\\Si-H\\|\\Me\end{array} +$$

(XII)

$$(b''+2) * M \xrightarrow{\text{Heterogeneous catalyst}}$$

$$M-[SiMe_2-O]_9-[SiMeH-O]_{4.5-b''}-\left[\begin{array}{c}Me\\|\\Si-O\\|\\M\end{array}\right]_{b''}-\begin{array}{c}Me\\|\\Si-M\\|\\Me\end{array}$$

Examples 1 to 3 relate to preparations according to the prior art and Examples 4 to 6 relate to preparations in accordance with the subject of our invention.

The viscosity of the oils functionalized with 1,2-epoxy-4-vinylcyclohexane, obtained in accordance with our process, is from about 200 to about 290 mPa.s; this viscosity is less than that of the oils obtained by the processes of the prior art; this reflects, in particular, the absence of opening of the rings containing an oxygen atom and thus the absence of polymerization reactions, which includes their absence during the devolatilization operation, due to the opening of these rings. In addition, the assayed epoxy content/theoretical epoxy content ratio is higher for the oils prepared in accordance with the process according to our invention.

The ≡SiH units present on the functionalized oils obtained are assayed by gasometry. The amount of $H_2$ released during the reaction between the functionalized silicone oil obtained and 1-butanol in the presence of potassium hydroxide as catalyst (2 g of KOH in 50 ml of 1-butanol) is measured.

The coloration of the functionalized oils obtained is measured using a "liquid-tester LTM1" machine from Dr. Lange using two beams for the transmission measurement.

The turbidity of the functionalized oils obtained is measured using a Hack turbidimeter by light scattering (measurement by ratio).

The platinum content of the functionalized oils obtained is measured by ICP-MS.

The viscosity of the functionalized oils obtained is measured using a Brookfield machine according to the dynamic method (by shearing).

The assay of the epoxy groups on the functionalized oils obtained is measured using a 716 DMS Titrino potentiometric machine from Metrohm according to the method of I. M. Kolthoff and P. J. Elving ("Trease on Analytical Chemistry", part II, vol. 14, p. 288).

Example 1

4.84 µl of a homogeneous Karstedt catalytic composition containing 11.6% Pt (10.0 ppm of Pt In the medium) and 52 g (61.88 meq.) of oil of formula (XI) were introduced, under argon, into a 100 ml three-necked flask equipped with a vertical stirrer, a condenser, a thermometer and a septum.

This mixture is heated to 90° C. 4.13 g (33.28 mmol, b'=3.5) of 1,2-epoxy-4-vinylcyclohexane are then run in over a period of 1 h.

At the end of the addition, the degree of conversion of ≡SiH is 49.7%.

After devolatilization at 90° C. for 1 h, a functionalized oil with a viscosity of 1096 mPa.s is recovered.

The coloration of the oil is 163 Hazen and the platinum content is 11.6 ppm.

The assayed epoxy group content/theoretical epoxy group content ratio is 0.84.

Example 2

9.68 µl of a homogeneous Karstedt catalytic composition containing 11.6% Pt (20.0 ppm of Pt in the medium) and 52 g (61.88 meq.) of oil of formula (XI) were introduced, under argon, into a 100 ml three-necked flask equipped with a vertical stirrer, a condenser, a thermometer and a septum.

This mixture is heated to 90° C. 4.13 g (33.28 mmol, b'=3.5) of 1,2-epoxy-4-vinylcyclohexane are then run in over a period of 1 h.

At the end of the addition, the degree of conversion of ≡SiH is 50.9%.

Heating is continued for 3 h.

The functionalized oil obtained is crosslinked and is in solid form.

Example 3

18.62 µl of a homogeneous Karstedt catalytic composition containing 11.6% Pt (20.0 ppm of Pt in the medium) and 63 g (456.1 meq.) of oil of formula (XII) were introduced, under argon, into a 250 ml three-necked flask equipped with a vertical stirrer, a condenser, a thermometer and a septum.

This mixture is heated to 110° C. 45.0 g (228.1 mmol, b''=1.25) of allyloxypiperidine are then run in over a period of 1 h.

At the end of the addition, the degree of conversion of ≡SiH is 51.1%.

After devolatilization at 120° C. for 1 h, the functionalized oil is recovered.

The coloration of the oil is 966 Hazen and the platinum content is 11.6 ppm.

Example 4

0.36 g of a heterogeneous catalytic composition containing 3% Pt on 7075 carbon black support from the company Engelhard (100 ppm of Pt), 100 g of tetrahydropyran and 100 g (in 119.4 meq.) of oil of formula (XI) were introduced, under argon, into a 500 ml three-necked flask equipped with a vertical stirrer, a condenser, a thermometer and a septum.

This mixture is heated to 86° C. 8.4 g (59.7 mmol, b'=3.5) of allylsuccinic anhydride are then run in over a period of 3 h.

At the end of the addition, 100 ppm of the catalytic composition are added. After 6 h, the degree of conversion is 33%. After 24 h, the degree of conversion of ≡SiH is 48.6%.

After devolatilization at 120° C. for 3 h, the funtionalized oil is recovered.

The coloration of the oil is 12 Hazen and the platinum content is 0.11 ppm.

Example 5

0.32 g of a heterogeneous catalytic composition containing 3% Pt on 7075 carbon black support from the company Engelhard (100 ppm of Pt) and 100 g (in 119.4 meq.) of oil of formula (XI) were introduced, under argon, into a 500 ml three-necked flask equipped with a vertical stirrer, a condenser, a thermometer and a septum.

This mixture is heated at 90° C. 11.1 g (59.7 mmol, b"=3.5) of allyloxypiperidine are then run in over a period of 3 h.

After the addition, the degree of conversion is 40.8%. After a further 2 h, the degree of conversion of ≡SiH is 50.4%.

After devolatilization at 140° C. while "stripping" with hot air for 3 h (vacuum: $1.33 \times 10^2$ Pa), the functionalized oil is recovered.

The coloration of the oil is 24 Hazen and the platinum content is 0.09 ppm.

Example 6

0.283 g of a heterogeneous catalytic composition containing 2.5% Pt on CECA 2S carbon black support from the company CECA (10 ppm of Pt) and 500 g (3.62 eq) of oil of formula (XII) were introduced, under argon, into a one-liter three-necked flask equipped with a vertical stirrer, a condenser, a thermometer and a septum.

This mixture is heated to 120° C. 11.1 g (59.7 mmol, b"=1.25) of 1,2-epoxy-4-vinylcyclohexane are then run in over a period of 1 h.

After the addition, the degree of conversion is 47.6%. After a further 2 h, the degree of conversion of ≡SiH is 49.3%.

After filtration and devolatilization at 120° C. under a vacuum of $1.33 \times 10^2$ Pa for 3 h, the functionalized oil is recovered.

The coloration of the oil is 18 Hazen and the platinum content is 0.12 ppm.

The assayed epoxy group content/theoretical epoxy group content ratio is 0.98.

What is claimed is:

1. A process for the preparation of a stable silicone oil containing ≡SiH groups, starting with reagents which are a first silicone oil containing ≡SiH groups and monomers, this process comprising the steps of:
    (a) adding in a reactor an amount of from 5 to 5000 ppm, of heterogeneous catalytic composition relative to the total mass of the reagents;
    (b) adding said first silicone oil in said reactor;
    (c) heating to a temperature of between 25° C. and 200° C.; then
    (d) adding the monomers over a period of time of between 0 and 24 hour in said reactor, the monomer/≡SiH molar ratio of said oil being between 0.0001 and 1; then
    (e) separating the silicone oil obtained containing ≡SiH groups from the heterogeneous catalytic composition; and
    (f) finally devolatilizing the silicone oil containing ≡SiH groups to obtain the stable silicone oil;

said monomers having the formula:

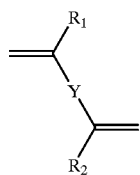

(I)

wherein:

the symbols $R_1$ and $R_2$, being identical or different, are a hydrogen atom, a phenyl radical or a linear or branched alkyl radical containing from 1 to 12 carbon atoms;

the symbol Y corresponds to Y'-Y"-Y' wherein:
    the symbol Y" is a divalent radical selected from the group consisting of: —(C=O)—, —(NH)—, —O—, —(C=O)—O—, —NH—(C=O)—, and a free valency,
    the symbols Y', being identical or different, is a divalent hydrocarbon-radical selected from the group consisting of linear alkyl radicals containing from 1 to 6 carbon atoms, branched alkyl radicals containing from 1 to 6 carbon atoms, and a free valency, optionally one of the radicals Y' being a phenyl radical or an alkylaryl radical wherein the linear or branched alkyl part of the alkylaryl radical comprises 1 to 6 carbon atoms.

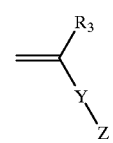

(II)

wherein:

the symbol Z is a monovalent radical —$NHR_4$ or OH, the symbols $R_3$ and $R_4$, being identical or different, are a hydrogen atom, a phenyl radical or a linear or branched alkyl radical containing from 1 to 12 carbon atoms;

the symbol Y corresponds to Y'-Y"-Y', wherein:
    the symbol Y" is a divalent radical selected from the group consisting of: —(C=O)—, —(NH)—, —O—, —(C=O)—O—, —NH—(C=O)— and a free valency,
    the symbols Y', being identical or different, are a divalent hydrocarbon-based radical selected from the group consisting of linear alkyl radicals containing from 1 to 6 carbon atoms, branched alkyl radicals containing from 1 to 6 carbon atoms, and a free valency, optionally one of the radicals Y' being a phenyl radical or an alkylaryl radical wherein the linear or branched alkyl part of the alkylaryl radical comprises 1 to 6 carbon atoms,

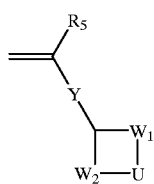

in which:
- the symbol U is a divalent radical selected from the group consisting of: —NH—, —(C=O)—, —(C=O)—NH—, and —(C=O)—O—(C=O)—,
- the symbol $R_5$ is a hydrogen atom, a phenyl radical and linear or branched alkyl radicals containing from 1 to 12 carbon atoms;
- the symbols $W_1$ and $W_2$, being identical or different, is a divalent hydrocarbon-based radical selected from the group consisting of a phenyl radical, linear alkyl radicals containing from 1 to 12 carbon atoms, branched alkyl radicals containing from 1 to 12 carbon atoms, alkylaryl radicals wherein the linear or branched alkyl part of the alkylaryl radical comprises 1 to 6 carbon atoms, and a free valency,
- the symbol Y corresponds to Y'-Y"-Y', wherein:
  - the symbol Y" is a divalent radical selected from the group consisting of: —(C=O)—, —(NH)—, —O—, —(C=O)—O—, —NH—(C=O)—, and a free valency.
  - the symbols Y', being identical or different, is a divalent hydrocarbon-based radical selected from the group consisting of linear alkyl radicals containing from 1 to 6 carbon atoms, branched alkyl radicals containing from 1 to 6 carbon atoms, and a free valency, optionally one of the radicals Y' being a phenyl radical or an alkylaryl radical wherein the linear or branched alkyl part comprises 1 to 6 carbon atoms,

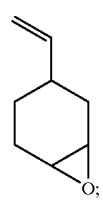

(IV)

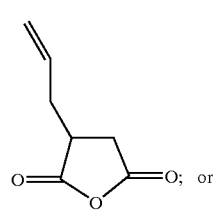

(V)

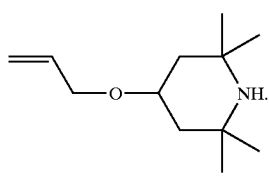

(VI)

2. A process according to claim 1, wherein:
- in step (a) the amount of heterogeneous catalytic composition is from 10 to 100 ppm relative to the total mass of the reagents;
- in step (c) said reaction medium is heated to a temperature of between 50° C. and 160° C.; and
- in step (d) the period of time of adding the monomers is between 2.5 and 5 h.

3. A process according to claim 1, wherein in step (e) the separation of the silicone is carried out by filtration.

4. A process according to claim 1, wherein said monomers bear a vinyl or allylic unit.

5. A process according claim 1, wherein $R_1$, $R_2$, $R_3$, $R_4$, and $R_5$ identical or different are a hydrogen atom or a methyl radical.

6. A process according to claim 1, wherein the heterogeneous catalytic composition comprises a metal selected from the group consisting of cobalt, rhodium, ruthenium, platinum and nickel, deposited on an inert support.

7. A process according to claim 6, wherein the metal is platinum.

8. A process according to claim 6, wherein the inert support is selected from the group consisting of carbon black, charcoal, alumina, silica, barium silicate and barium sulphate.

9. A process according to claim 8, wherein the inert support is carbon black.

10. A process according to claim 6, wherein the amount of metal is between 0.1% and 5% relative to the weight of the inert support.

11. A process according to claim 6, wherein the amount of metal in the catalytic composition is between 1 and 1000 ppm relative to the weight of the silicone oil.

12. A process according to claim 1, wherein the first silicone oil is linear or cyclic and of average formula(e) (VII) or (VIII):

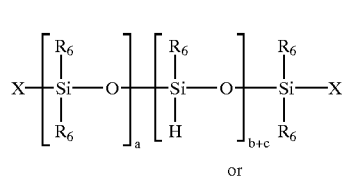

(VII)

or

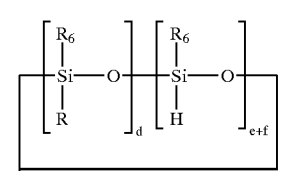

(VIII)

wherein:
- the symbols $R_6$ are identical or different and are a phenyl radical, linear alkyl radicals containing from 1 to 6 carbon atoms or branched alkyl radicals containing from 1 to 6 carbon atoms;
- the symbols X are identical or different and are $R_6$, a hydrogen atom, a methoxy radical or an ethoxy radical;
- a, b and c are integers or fractions such that;
  $0 < a \leq 1000$
  $0 \approx b+c \leq 200$ and at least one of the two groups X corresponds to a hydrogen radical if b+c=0,
  $1 < a+b+c \leq 1000$, d, e and f are integers or fractions such that:
0<d<10, and
1<e+f<10.

13. A process according to claim 12, wherein:

0<a≦100

1<b+c≦100

1<a+b+c≦100;

d, e and f are integers or fractions such that:
0<d<5, and
1<e+f<5.

14. A process according to claim 1, wherein the first silicone oil contains an epoxide.

15. A process according to claim 1, wherein at least one of the hydrosilylable functions in the stable silicone oil contains a "HALS" function. Marked-up amended claims according to 37 C.F.R. 1.121 are submitted in an attached document. Added matter is shown by underline and deleted matter is shown by strikethrough.

16. An anti-adhesive product for paper, glass or plastic comprising a silicone oil prepared by the process of claim 1.

* * * * *